United States Patent

Lin et al.

[11] Patent Number: 5,880,960
[45] Date of Patent: Mar. 9, 1999

[54] METHOD TO IMPROVE WIP BALANCE IN A MANUFACTURING LINE

[75] Inventors: Kuo-Chen Lin; Sheng-Rong Huang, both of Hsin-Chu; Yi-Chin Hsu, Taipei, all of Taiwan

[73] Assignee: Taiwan Semiconductor Manufacturing Company, Ltd., Hsin-Chu, Taiwan

[21] Appl. No.: 789,722

[22] Filed: Jan. 27, 1997

[51] Int. Cl.⁶ ........................................... G06F 17/11
[52] U.S. Cl. ........................... 364/468.05; 364/468.06
[58] Field of Search ........................... 364/468, 468.05, 364/468.06, 468.07, 468.08

[56] References Cited

U.S. PATENT DOCUMENTS

| 5,229,948 | 7/1993 | Wei et al. | 364/468.05 |
| 5,304,066 | 4/1994 | Santag | 434/219 |
| 5,396,432 | 3/1995 | Saka et al. | 364/468.18 |
| 5,446,671 | 8/1995 | Weaver et al. | 364/468.06 |
| 5,548,518 | 8/1996 | Dietrich et al. | 364/468.06 |

OTHER PUBLICATIONS

G. Leonovich, An Approach for Optimizing WIP/Cycle Time/Output in a Semiconductor Fabricator, IEEE, pp. 108 to 111, Sep. 1994.

Carolyn S. Toof, Manufacturing Ownership of Work–In–Process Control, IEEE, pp. 69 to 72, May 1992.

*Primary Examiner*—Reba I. Elmore
*Assistant Examiner*—Shelly A Chase

*Attorney, Agent, or Firm*—George O. Saile; Stephen B. Ackerman; William J. Stoffel

[57] ABSTRACT

The invention provides an index of line balance method for maintaining optimum queued quantities of products at a manufacturing step and over an entire manufacturing line. The method begins by: first, assigning a daily standard move of product (Std Move) which should be produced in a manufacturing line. Second, the standard WIP StdWIP is calculated for each manufacturing stage i by multiplying the theoretical cycle time C/T of each stage by the daily standard move StdMove; (i.e., StdWIP=CT*StdMove). Third, the difference Di between the current WIP CWi and standard WIP StdWIP at every stage i. (Di=Cwi–Swi, ) is calculated. Fourth, the cumulative difference CDi between current WIP Cwi and standard WIP StdWIP of every stage i from stage i to stage n is calculated.

$$\left( CDi = \sum_{j=i}^{n} Dj \text{ where } I = 1, 2, \ldots n \text{ (the index of stage)} \right).$$

Fifth, the index of line balance BIi is calculated by dividing the sum of all positive CDi from stage i to stage n by the absolute value of the sum of all negative CDi from stage i to stage n. Next, the index of line balance BIi for each stage i is plotted as a line chart for each stage i. Lastly, additional production resources (e.g., tools) are allocated to the stages that have an index of line balance BIi greater than 1.2 and production resources are reduced to the stages that have an index of line balance BIi less than 0.80. The method reduces WIP, cycle time and costs by better allocating manufacturing resources.

5 Claims, 6 Drawing Sheets

Determine the Daily standard move of every stage based on production schedule

↓

Calculate standard WIP of every stage

↓

Calculate the index of line balance for each stage

↓

Create a line balance chart

↓

Adjust WIP over the enire line to obtain an index of line balance = ~ 1

*FIG. 1*

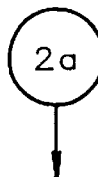

2) Calculate the cumulative Di from stage i to last stage n $$CDi = \sum_{j=i}^{n} Dj$$

where
  i = 1,2,...n (the index of stage)
  CDi = the cumulative Di of stage i, from stage i to last stage n Calculate the index of line balance (BIi)

$$BIi = \frac{\sum_{j=1}^{n} CDj, \text{ where } CDj >=0, \; j = i,....n}{\left|\sum_{j=1}^{n} CDj\right|, \text{ where } CDj >0, \; j = i,....n}$$

Adjust WIP over entire line to obtain an index of line balance = ~1

*FIG. 2b*

METHOD TO IMPROVE WIP BALANCE IN A MANUFACTURING LINE

BACKGROUND OF INVENTION

1) Field of the Invention

This invention relates generally to a versatile production system and method for operating the system. The system manufactures various kinds of products including semiconductor chips. The present system relates to methods for scheduling jobs on a production line to minimize the work in progress (WP). The system includes a measurement of how well jobs are distributed along the manufacturing line.

2) Description of the Prior Art

In general, in a production line for manufacturing products, a production control center controls the flow of jobs throughout the production line. In many production lines, the same types (sets) of tools can be used to process product at different steps. For example, in manufacturing semiconductors, product wafers undergo a general cycle of depositing a layer, covering the layer with a photoresist, etching the layer, removing the photo resist, and depositing another layer (or doping some exposed portion). Many of the equipment used to perform these operations can be used in several different product stages. For example, a photoresist patterning tool (e.g., optical exposers) could be used at the following product stages: field oxide photo, source/drain photo, gate electrode photo, contact photo, etc. Other equipment is used repeatedly, such as ion implanter, CVD tools, etch stations, etc.

A challenge of production line managers is to schedule or utilize the resources (such as equipment or personnel) in an efficient manner to maximize the product throughput. However, presently there isn't an effective method to determine the correct amount of jobs (WIP—Work in progress) and distribution of the jobs over the entire production line. The WIP will accumulate in some stages where it isn't really needed or useful. Many production supervisors make the decision to allocate local machines (and other manufacturing resources) based on their experience. These decision may further overload the sectors in some sections of the production line and under load the sectors in other sections of the line.

Practitioners have taken many different approaches to scheduling and monitoring manufacturing lines. For example, U.S. Pat. No. 5,446,671 (Weaver et al.) shows a look ahead method for maintaining optimum queued quantities of in-progress parts at a manufacturing bottleneck. U.S. Pat. No. 5,396,432 (Saka et al.) shows a production system to minimize line balance loss. U.S. Pat. No. 5,304,066 (Sontag) shows a machine shop management system for managing the work progress of production jobs.

There is still a need for a method of monitoring the WIP in the manufacturing line and determining the optimum amount of WIP at each stage.

SUMMARY OF THE INVENTION

It is an object of the present invention to provide a method of monitoring the amount WIP in the manufacturing line and determining the optimum amount of WIP at each stage.

It is an object of the present invention to provide a method of providing a manufacturing schedule which reduces cycle time and reduces WIP.

To accomplish the above objectives, the present invention provides an index of line balance method of maintaining optimum queued quantities of products at a manufacturing step and over an entire manufacturing line. The method begins by:

a) assigning a daily standard move of product (Std Move) which should be produced in a manufacturing line, the manufacturing line comprised of n number of stages i; each stage having a theoretical cycle time CT; each stage having a current WIP $CW_i$, b) calculating the standard WIP StdWIP for each manufacturing stage i by multiplying the theoretical cycle time C/T of each stage by the daily standard move StdMove ; (i.e., StdWIP=CT*StdMove)

c) Calculating the difference $D_i$ between the current WIP $CW_i$ and standard WIP StdWIP at every stage i; ($D_i=Cw_i-Sw_i$)

d) calculating the cumulative difference $CD_i$ between the current WIP $Cw_i$ and standard WIP StdWIP of every stage i from stage i to stage n;

$$CD_i = \sum_{j=i}^{n} D_j \text{ where } I = 1, 2, \ldots n \text{ (the index of stage)}$$

e) Calculating the index of line balance $BI_i$ by dividing the sum of all positive $CD_i$ from stage i to stage n by the absolute value of the sum of all negative $CD_i$ from stage i to stage n;

f) plotting the index of line balance $BI_i$ for each stage i as a line chart for each stage i;

g) eliminating extra WIP (e.g., moving jobs, adding tools/personnel resources) in the stages that have an index of line balance $BI_i$ greater than about 1.2 and adding WIP (e.g., pulling WIP to stage i or reducing production resources /tools/personnel) to the stages that have an index of line balance $BI_i$ less than about 0.80.

The invention's index line of balance $BI_i$ reduces the overall line work in progress (WIP) which reduces inventory and carrying costs. The invention also reduces cycle time which improves product delivery. The line of balance control system is relatively easy to implement and provides useful information to production personnel.

BRIEF DESCRIPTION OF THE DRAWINGS

The features and advantages of the index of line balance method of the current invention and further details of the production scheduling method will be more clearly understood from the following description taken in conjunction with the accompanying drawings in which:

FIG. 1 is a flow chart of the steps in the index of line balance production planning method of the present invention.

FIGS. 2A and 2B are a more detailed flow chart of the calculations for the index of line balance production planning method of the present invention.

DETAILED DESCRIPTION OF THE PREFERRED EMBODIMENTS

Figure 2A:
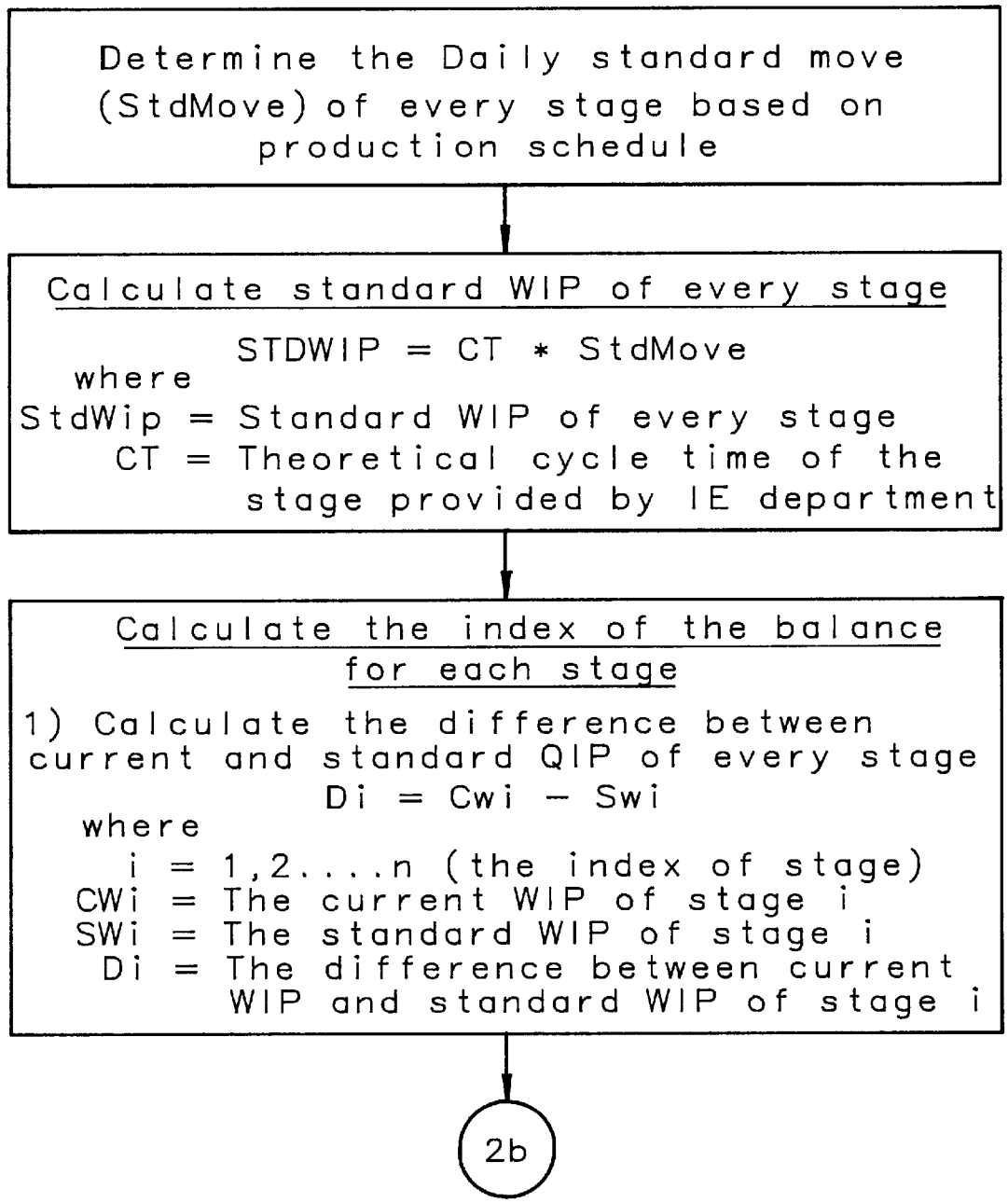

The present invention provides a method of monitoring and optimizing the allocation of resources to a manufacturing line in order to reduce WIP and cycle time. The invention provides an method of calculating a line balance index which is used to measure the current status of product loading (WIP) in the manufacturing line. The invention provides limits at which manufacturing resource should be shifted to the manufacturing stages that have an excess of WIP. The line index method of the invention is described as follows.

Decide Daily Standard Move (StdMove) of Every Stage

According to the master production schedule (MPS) provided by "production control" department, the quantity of every product needed to be manufactured in that month are calculated.

The daily average move (StdMove) of every stage can be therefore be determined depending on the different processes of various products. (The MPS sets the StdMove.)

Calculate Standard WIP of Every Stage

Next, the standard WIP (work in progress—number of jobs being queued at a stage) is calculated using the following equation.

$$StdWIP = CT * StdMove$$

where

StdWIP=Standard WIP of every stage

CT=Theoretical cycle time of the stage provided by IE department

StdMove=the quantity of product (e.g., wafers) that needs to be processed at etch stage per time period (e.g., per day) (Standard move of every stage is acquired from step 1 above)

Next, a series of calculations are performed to measure how much WIP the line contains compared to the ideal amount of WIP. This is called the index of line balance (BIi). Three main calculations are performed as shown below to obtain the "index of line balance" (BIi). The index of line balance is a measure of the WIP loading over the entire production line.

Calculate the Difference Between Current WIP and Standard WIP of Every Stage.

The difference is calculated between current WIP and standard WIP of every stage using the following equation.

$$Di = CWi - SWi,$$

where

I=1,2, . . . n (the index of stage)

CWi=The current WIP of stage

SWi=The standard WIP of stage

Di=the difference between current WIP and standard WIP of every stage

Calculate the Cumulative Di from Stage i to Last Stage n

Next, the cumulative Di from stage i to last stage n is calculated using the equation below.

$$CDi = \sum_{j=i}^{n} Dj \text{ where } I = 1, 2, \ldots n \text{ (the index of stage)}$$

where CDi=the cumulative Di of stage i, from stage i to last stage n

Calculate the Index of Line Balance (BIi)

An index of line balance BIi is calculated by dividing the sum of all positive CDi from stage i to stage n by the absolute value of the sum of all negative CDi for stage i to stage n. The index of line balance is calculated as shown below.

$$BIi = \frac{\sum_{j=i}^{n} CDj, \text{ where } \_\_CDj >= 0, j = i, \ldots, n}{\left| \sum_{j=i}^{n} CDj \right|, \text{ where } \_\_CDj < 0, j = i, \ldots, n}$$

where BIi=the index of line balance of every stage i

For every stage i, the BIi value (Index of line balance) indicates the WIP) situation from stage i to last stage (n). Next, as shown on FIG. 3, a line balance chart is made by plotting the index of line balance (BIi) (y-axis) vs the manufacturing stage (i) (x-axis). The value of BIi doesn't indicate the WIP situation for only of one stage i; instead BIi indicates if the WIP quantity is higher or lower than standard WIP from stage i to stage n (e.g., of the entire production line).

From the line balance chart (e.g., FIG. 3), one can see the WIP distribution over the entire production line. The value of line balance index, BIi, equal to 1 means that the cumulative WIP is equal to the cumulative standard WIP from stage i to n and that the WIP situation of stages after stage "i" is optimal. According to our manufacturing experience, the index of line balance is acceptable when located between about 0.80 and 1.2. Other limits are possible based on the particular characteristics of the manufacturing line, equipment, cycle times, etc. A line balance index BIi of 1 is the target and the standard to measure the loading of the entire line against.

Using the Line Balance Chart to Improve Line Balance

The distribution of product in the manufacturing line should always be investigated by checking the entire line balance chart (for the entire manufacturing line), not by checking a single BIi value of some specific stage (i). By monitoring the line balance chart, we make better decisions to improve WIP situation and overall production. We interpret the value of BIi of every stage as the profile of production line as follows:

BIi=1: The cumulative WIP and cumulative standard WIP) is equivalent from stage i to stage n and the production line is either absolutely balance or WIP level need to be adjusted with in that period.

BIi>1: The WIP level is higher than standard with the period from stage i to stage n and the extra WIP should be eliminated and pushed out of the production line. (e.g., Extra tools/personnel can be added).

BIi<1: The WIP level is lower than standard within the period from stage i to stage n and the insufficient WIP should be pulled from the front end of the production line. (Less manufacturing resources (e.g., tools) can be allocated to this stage until the WIP increases.)

Figure 3:
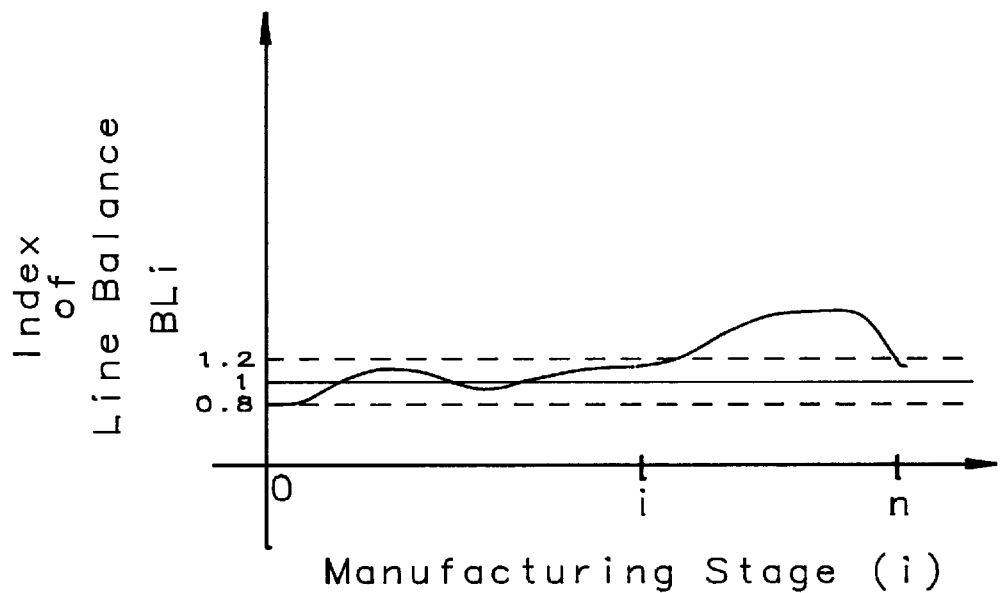
FIG. 3 is a line chart of the index of line balance ($BI_i$) by manufacturing stage i showing the method of the present invention.

As shown in the example in FIG. 3, since the value of indices (BIi) after stage i are greater than 1.2, it is observed that the WIP is piled up in the rear stage after stage i. Therefore the manufacturing tools and personal should be allocated to those stages after i in order to diminish the WIP and smooth the production line.

Results

Since this line balance method was implemented in March 1996, the related manufacturing index from Feb. to June, 1996 is shown below in table 1:

TABLE 1

|  | Feb. | Mar. | Apr. | May | June |
|---|---|---|---|---|---|
| WIP | 45758 | 43035 | 40215 | 39006 | 365560 |
| Move | 96959 | 95017 | 93523 | 91441 | 89865 |
| Wafers out | 38510 | 48006 | 42978 | 43512 | 42505 |
| T/R (Turn ratio) | 2.12 | 2.21 | 2.33 | 2.34 | 2.46 |
| C/T - (cycle time in days) | 30.4 | 28.9 | 28.0 | 28.1 | 27.1 |
| C/T per Layer | 2.2 | 2.1 | 2.0 | 2.0 | 1.9 |

Figure 4:
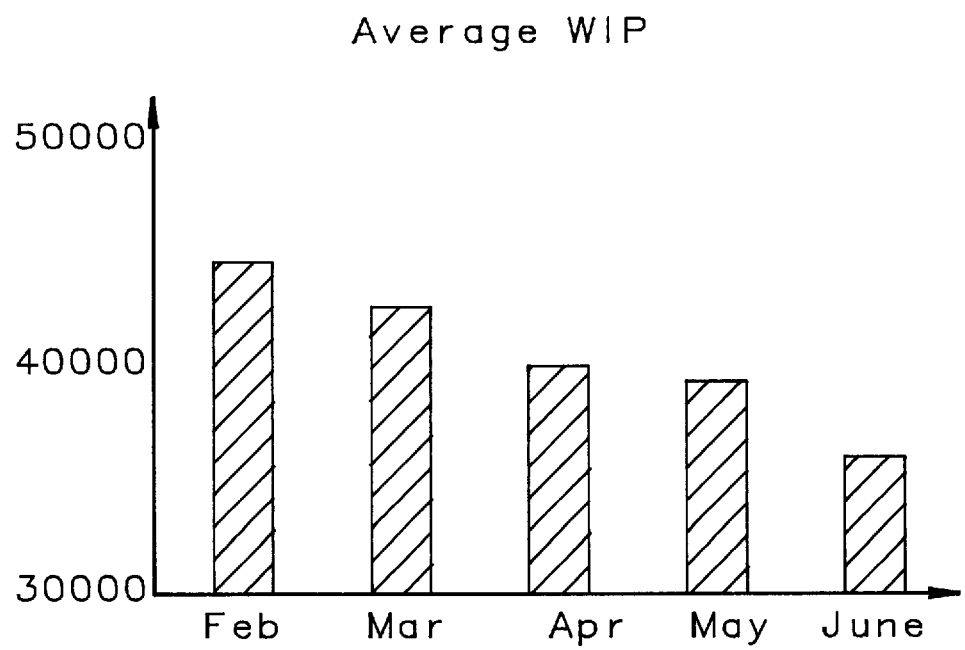
FIG. 4 is graph showing the reduction in average WIP in a manufacturing line after the implementation of the line balance index of the present invention.
Figure 5:
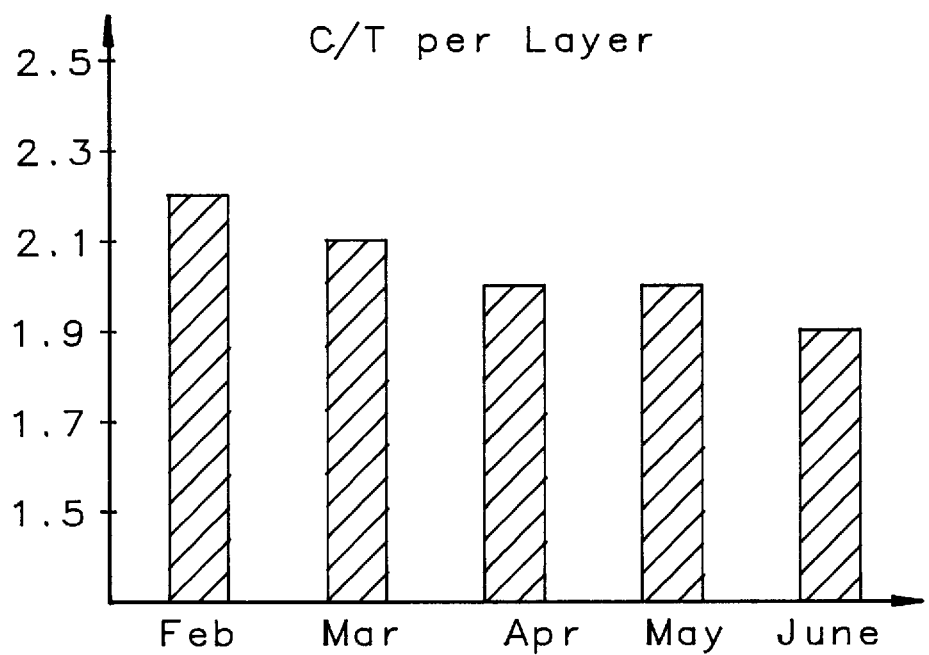
FIG. 5 is graph showing the reduction in Cycle time per layer in a manufacturing line after the implementation of the line balance index of the present invention.
Figure 6:
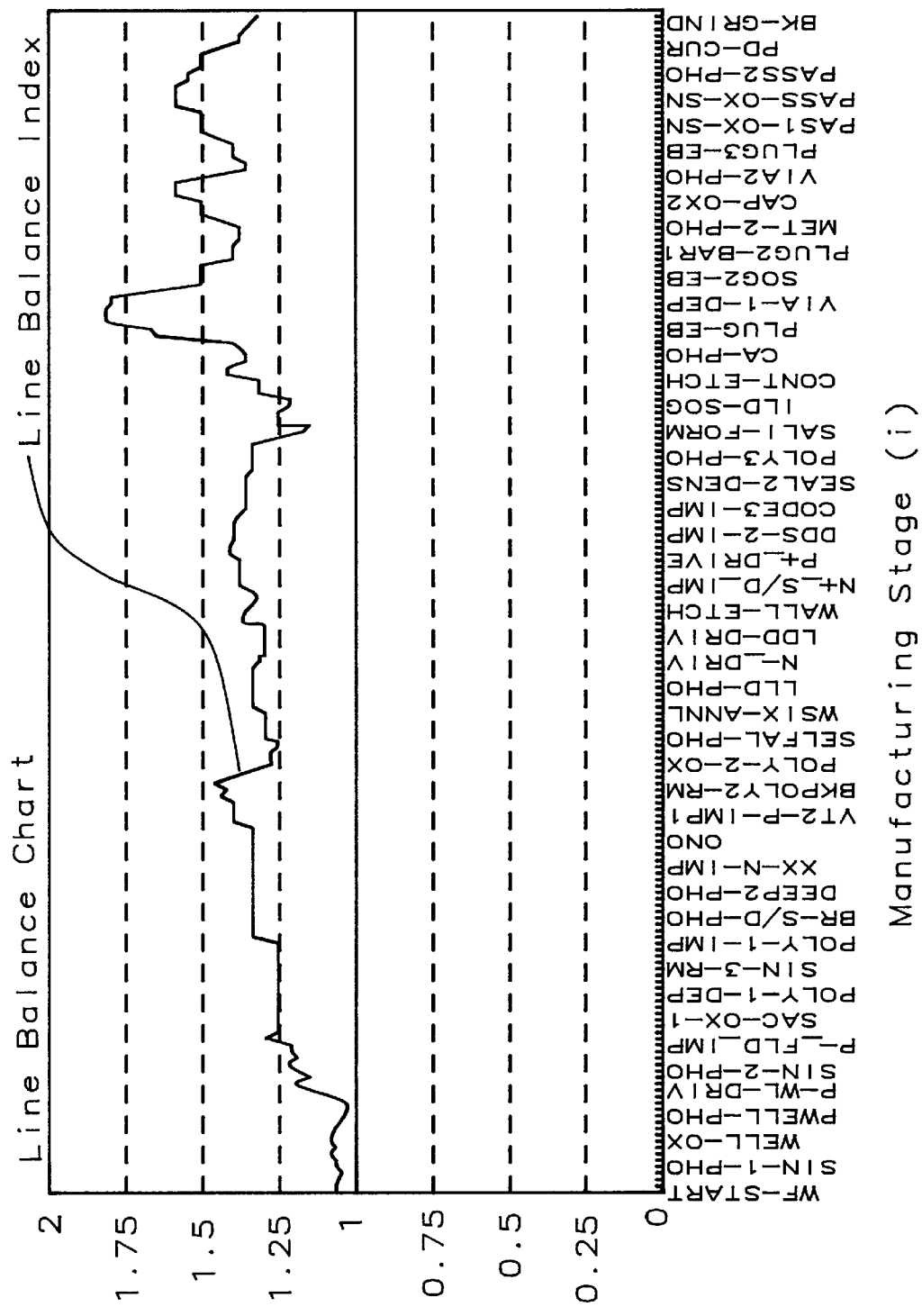
FIG. 6 is a daily line chart of the index of line balance as the reference for dispatching (after the implementation of the line balance index of the present invention).

Where:
WIP=the average daily WIP
Move is the total quantity of wafers processed at each production stage per day, but not finished in a month.
T/R is the turn ratio=(daily move)/WIP, =how many stages could each wafer be processed within a day on average.
C/T (cycle time) for the entire line (start to finish) (units=days)
These results are shown graphically in FIGS. 4 and 5.

If the production line is balanced as we planned, WIP should be located evenly over the entire production line. Using the index of line balance method the WIP can be minimized and product output can be increased. From the manufacturing index state above, we can tell that the average WIP was dropped from 45758 in Feb. to 3650 in June and the product (e.g., wafer) output was still maintained at the target level.

The reduction of WIP level causes a shortening of the queue time of product (e.g., wafer) in production line. Therefore, another benefit of line balance method is shorter product (e.g., wafer) cycle time per layer. The values in Table 1 indicates the cycle time per layer has improved from 2.2 date in Feb. to 1.9 in June 1996.

The results shown above indicate that the invention's index of line balance reduces work in progress (WIP) which reduces inventory and carrying costs. The invention also reduces cycle time which improves product delivery. The index of line balance control system is relatively easy to implement and provides useful information to production personal. The method can be implemented on any type of manufacturing line with all products.

While the invention has been particularly shown and described with reference to the preferred embodiments thereof, it will be understood by those skilled in the art that various changes in form and details may be made without departing from the spirit and scope of the invention.

What is claimed is:

1. A line balance index method of maintaining optimum queued quantities of products at a manufacturing step and over an entire manufacturing line, said method comprising:

a) assigning a daily standard move of product (Std Move) which should be produced in a manufacturing line, said manufacturing line comprised of n number of stages i; each stage having a theoretical cycle time CT; each said stage having a current WIP CWi;

b) calculating a standard WIP StdWIP for each manufacturing stage i by multiplying said theoretical cycle time C/T of each stage by said daily standard move Std-Move; (StdWIP=CT*StdMove)

c) Calculating a difference Di between said current WIP CWi and standard WIP StdWIP at every stage i; (Di= CWi–SWi,)

d) calculating a cumulative difference CDi between said current WIP Cwi and said standard WIP StdWIP of every stage i from stage i to stage n and assigning $$CDi = \sum_{j=i}^{n} Dj \text{ where } i = 1, 2, \ldots n \text{ (the index of stage)}$$

e) Calculating an index of line balance BIi by dividing the sum of all positive CDi from stage i to stage n by the absolute value of the sum of all negative CDi for stage i to stage n;

$$BIi = \frac{\sum_{j=i}^{n} CDj, \text{ where } CDj >= 0, i = 1, \ldots, n}{\left| \sum_{j=i}^{n} CDi \right|, \text{ where } CDj < 0, i = 1, \ldots, n}.$$

2. The method of claim 1 which further includes: plotting said index of line balance BIi for each stage i as a line chart for each stage i; and allocating additional production resources to the stages that have an index of line balance BIi greater than about 1.2 and reducing production resources to the stages that have an index of line balance BIi less than about 0.80.

3. The method of claim 1 which further includes: plotting said index of line balance BIi for each stage i as a line chart for each stage i; and allocating additional production resources to the stages that have an index of line balance BIi greater than about 1.0 and reducing production resources to the stages that have an index of line balance BIi less than about 1.0.

4. A line balance index method of maintaining optimum queued quantities of products at a manufacturing step and over an entire manufacturing line, said method comprising:

a) assigning a daily standard move of product (StdMove) which should be produced in a manufacturing line, said manufacturing line comprised of n number of stages i; each stage having a theoretical cycle time CT; each said stage having a current WIP CWi;

b) calculating a standard WIP StdWIP for each manufacturing stage i by multiplying said theoretical cycle time C/T of each stage by said daily standard move Std-Move; (StdWIP=CT*StdMove)

c) Calculating a difference Di between said current WIP CWi and standard WIP StdWIP at every stage i; (Di= CWi–SWi,)

d) calculating a cumulative difference CDi between said current WIP Cwi and said standard WIP StdWIP of every stage i from stage i to stage n and assigning $$CDi = \sum_{j=i}^{n} Dj \text{ where } i = 1, 2, \ldots n \text{ (the index of stage)}$$

e) Calculating an index of line balance BIi by dividing the sum of all positive CDi from stage i to stage n by the absolute value of the sum of all negative CDi for stage i to stage n;

$$BIi = \frac{\sum_{j=i}^{n} CDj, \text{ where } CDj >= 0, i = 1, \ldots, n}{\left| \sum_{j=i}^{n} CDi \right|, \text{ where } CDj < 0, i = 1, \ldots, n},$$

f) plotting the index of line balance BIi for each stage i as a line chart for each stage i; and g) allocating additional resources to the stages that have an index of line balance BIi greater than about 1.0 and reducing resources to the stages that have an index of line balance BIi less than about 1.0.

5. The method of claim 4 which further includes allocating additional resources to the stages that have an index of line balance BIi greater than about 1.2 and reducing resources to the stages that have an index of line balance BIi less than about 0.80.

* * * * *